Figure 1:
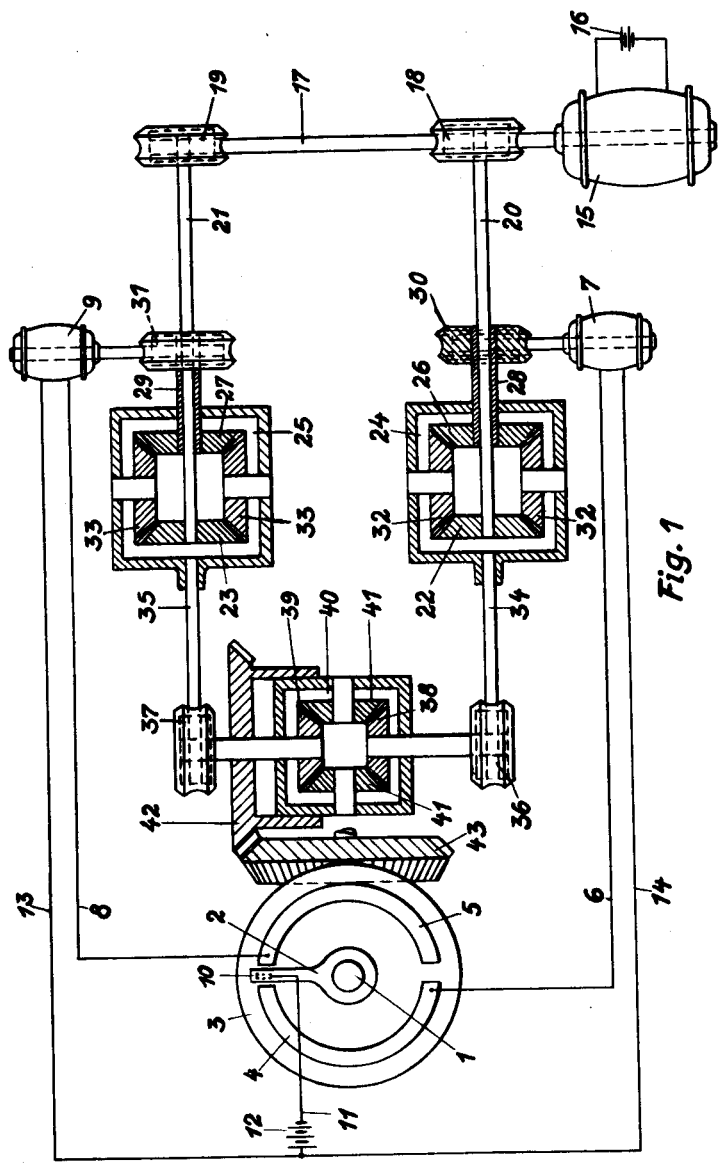

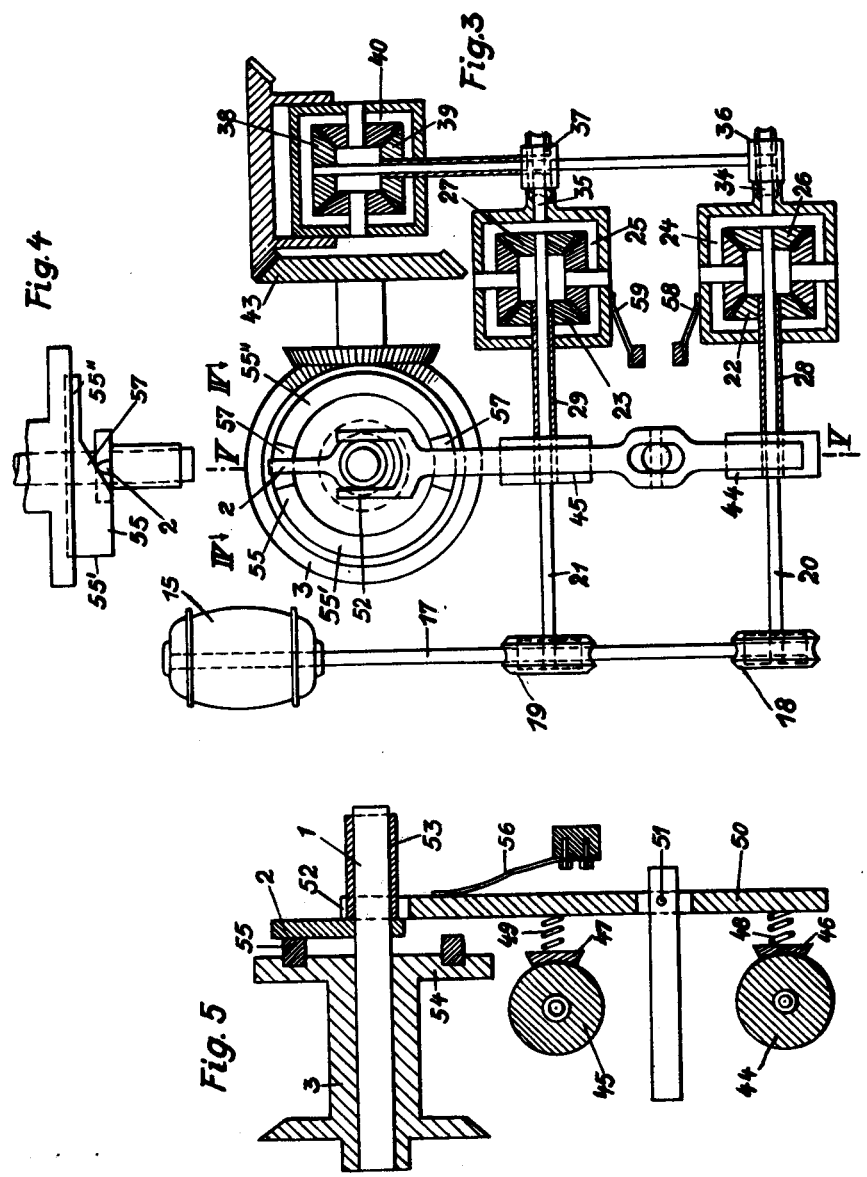

Patented June 26, 1934

1,964,188

UNITED STATES PATENT OFFICE 1,964,188

DEVICE FOR CONTROLLING A MOVABLE MACHINE PART

Hans von Karabetz, Jena, Germany, assignor to firm Carl Zeiss, Jena, Germany

Application July 19, 1932, Serial No. 623,385
In Germany July 25, 1931

10 Claims. (Cl. 74—34)

I have filed applications in Germany, July 25, 1931, and November 14, 1931.

The invention concerns a device for controlling a movable machine part the moving direction of which is changeable.

For the purpose of rendering it feasible to rapidly start heavy machine parts, a device of this kind is constructed according to the invention as follows. A continuously running driving machine (an electromotor, a steam engine, or the like) is so coupled to two differential wheel gears that two corresponding gears are rotated with equal angular speeds. Two shafts, each of which is driven by one of the two said differential wheel gears, act in such a manner upon a third differential wheel gear connected to the said machine part that this machine part is at rest when the two shafts rotate with equal angular speeds. The two first said differential wheel gears are connected electrically or mechanically to a control gear in such a manner that the angular speed of either the one or the other of the two shafts may be altered so as to cause the machine part to move in one sense or the other.

One constructional form of the device is arrived at by providing the control gear with two motors each of which rotates only in one and the same direction and by coupling each of these two motors to one of the first said differential wheel gears, so that these two motors may be started alternatively.

Instead of two motors, there may be used a reversing motor coupled to the two first differential wheel gears. It is advisable to dispose between this reversing motor and each of these two differential wheel gears a coupling acting in only one sense of rotation, so that the reversing motor may influence at a time only one of the two differential wheel gears, and this according to the sense in which it rotates.

Another constructional form of the device is arrived at when, with a view to influence the two first said differential wheel gears, the control gear is provided with a brake gear. This brake gear suitably has two controllable and two continuously acting brakes, the two continuously acting brakes having a braking effect inferior to that of the two controllable brakes, and each of the two controllable brakes and of the two continuously acting brakes influencing one of the first said differential wheel gears. The two first said brakes are to be so controlled that the two differential wheel gears may be alternatively withdrawn from the influence of the appertaining brake. The purpose of each of the two continuously acting brakes is to interrupt the rotation which the appertaining differential wheel gear imparts to the appertaining shaft when the appertaining controllable brake is released. The two controllable brakes are conveniently actuated by electro-magnets which are suitably controlled by a common adjusting member.

Another constructional form of the device is arrived at by providing the control gear with a hand-driven shaft and two couplings each of which is disposed between this shaft and one of the two first said differential wheel gears, these couplings being so constructed that driving the said shaft influences only one of these two differential wheel gears, the sense of rotation of this shaft determining which of the two differential wheel gears is to be influenced.

In another constructional form of the device, the control gear comprises a speed change gear driven by a motor, for instance a friction wheel gear, and two couplings each of which is disposed between the driven shaft (rotating with changeable speed) of the speed change gear and one of the two first said differential wheel gears, the couplings being so constructed that, when the said shaft is rotating, only one of these two differential gears is influenced, the sense of rotation of this shaft determining which of the two differential wheel gears is to be influenced.

With a view to prevent any undesired working of the differential wheel gears and in order to effect the control by means of the slightest possible energy, automatically locking gears are to be disposed at suitable places.

Figure 2:
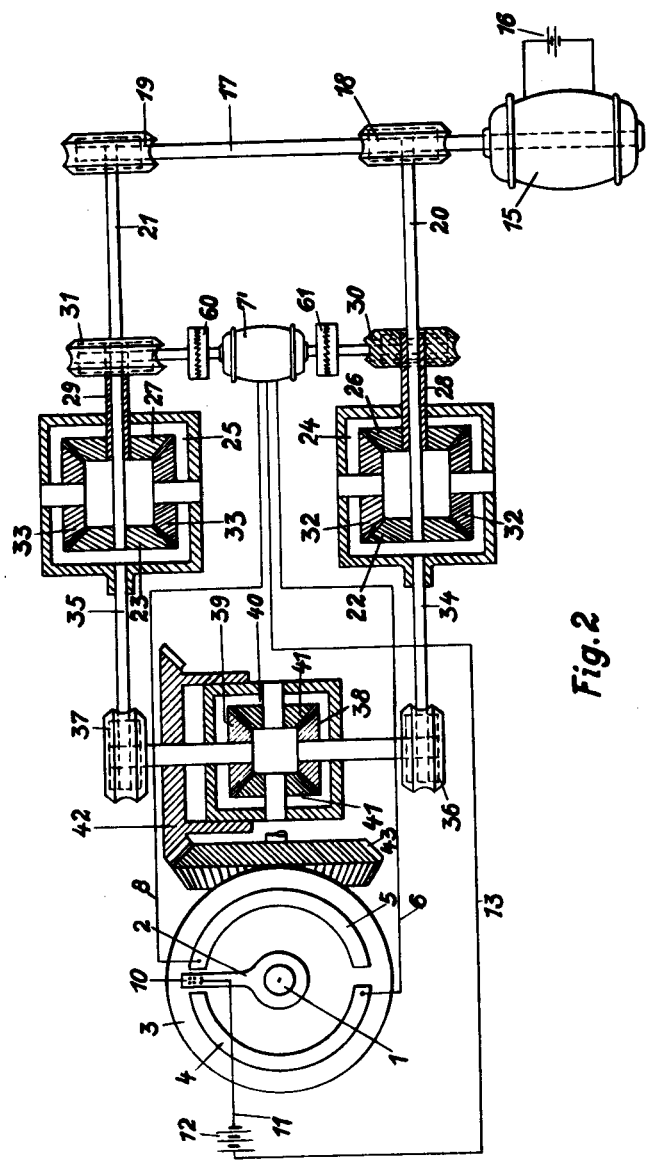
Figure 6:
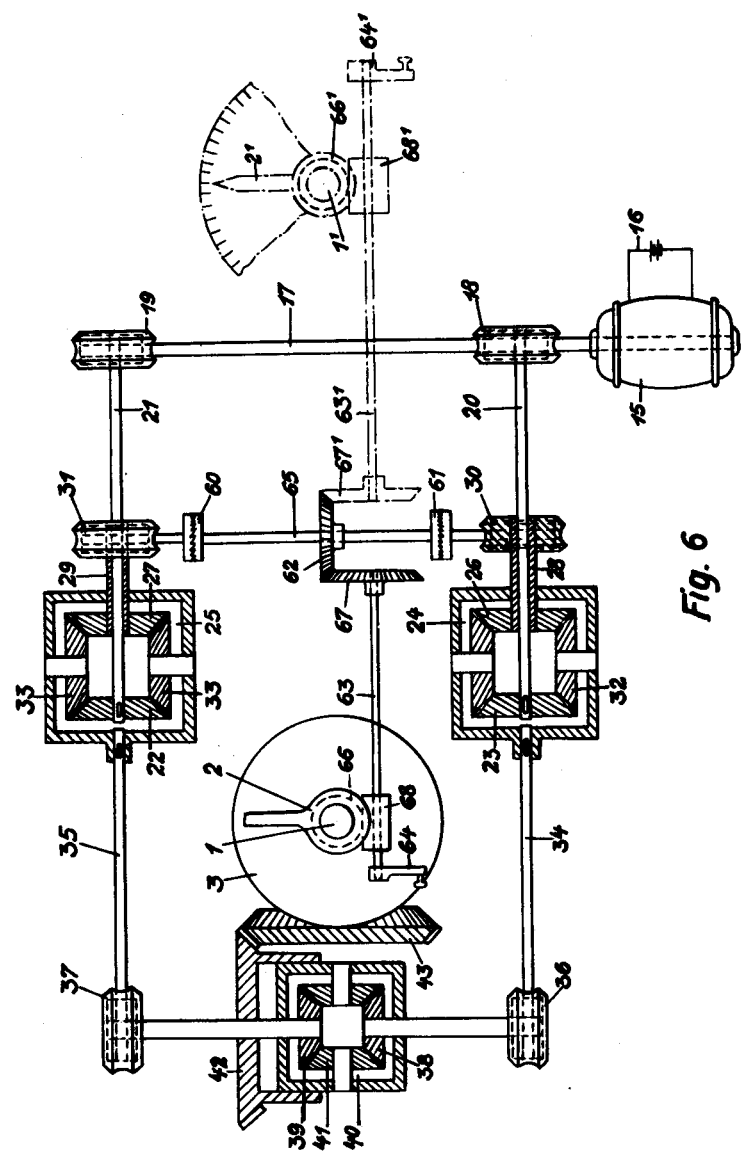
Figure 7:
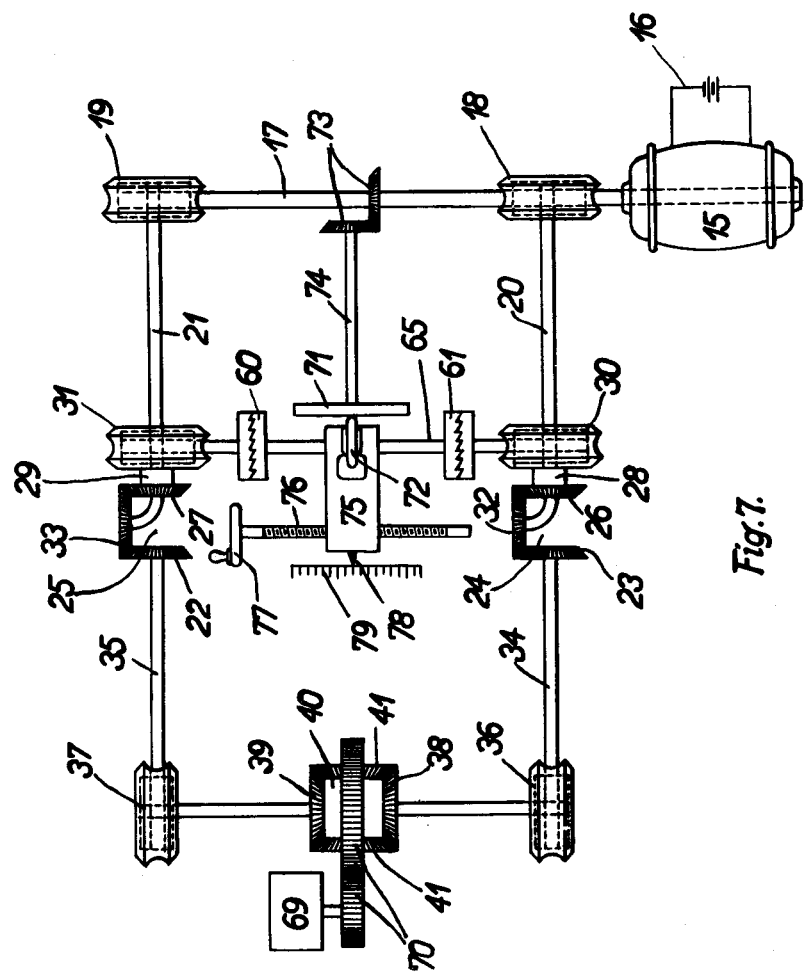

The accompanying drawings schematically represent five constructional examples of a device constructed according to the invention. Figure 1 shows the plan view of the first constructional example, in which the control gear contains two motors with unchangeable direction of rotation. Figure 2 shows the plan view of the second constructional example, in which the control gear is provided with a reversing motor. Figures 3 to 5 represent the third constructional example, in which the control gear is provided with a brake device, Figure 3 being a plan view, Figure 4 a partial view, seen in the direction of the arrows IV—IV in Figure 3, and Figure 5 a section through the line V—V in Figure 3. Figure 6 illustrates in a plan view the fourth constructional example, in which the differential gears are operated by hand. Figure 7 represents a plan view of the fifth constructional example, in which the control gear contains a speed change gear.

In the constructional example according to Figure 1, a shaft 1 is connected to a lever 2 representing the adjusting member and being operated by hand. On the same shaft is disposed the following member which is assumed to be coupled to a machine member to be moved in one sense or the other, the following member being represented in the drawings only by a bevel wheel 3. On the front surface of the bevel wheel 3 are disposed two semicircular contact bars 4 and 5 which are connected by wires 6 and 8 to small control motors 7 and 9, respectively. The lever 2 is provided with a sliding contact 10 which may slide on the contact bars 4 and 5 and connected by means of a wire 11 to one pole of a source of current 12. The other pole of the source of current 12 is connected by wires 13 and 14 to the free clamps of the electromotors 9 and 7.

The motors 7 and 9 merely serve the purpose of controlling the gear and, as a consequence, their output is as small as, say, below 0.2 H. P. The driving energy is produced by a strong electromotor 15 which is fed by a source of current 16 and rotates continuously. Through the agency of the two worm gears 18 and 19 the shaft 17 of the electromotor 15 drives two shafts 20 and 21 which rotate with equal numbers of revolution. The shafts 20 and 21 drive crown wheels 22 and 23 belonging to differential gears 24 and 25, respectively. The other two crown wheels 26 and 27 of the differential gears are fixed to hollow shafts 28 and 29, respectively, which may be driven by automatically locking worm gears 30 and 31 operated by the electromotors 7 and 9. The housings supporting the planet wheels 32 and 33 of the differential gears are coupled to shafts 34 and 35 which, through the agency of worm gears 36 and 37, drive the two crown wheels 38 and 39, respectively, of a third differential gear 40. The worm gears 36 and 37 are so chosen that the housing which carries the planet wheels 41 of this gear 40 is in its position of rest when 34 and 35 rotate with equal angular speeds. The said housing is rigidly connected to a bevel wheel 42 driving the following member 3 by means of a bevel wheel 43.

The device works as follows.

In the position of rest represented in the drawings, the adjusting member 2 does not touch with its contact 10 any of the contact bars 4 and 5, and, as a consequence, the control motors 7 and 9 as well as the crown wheels 26 and 27 of the differential gears 24 and 25 are at rest. The driving motor 15 rotates continuously and drives the shafts 20 and 21 which, the crown wheels 26 and 27 being at rest, cause the shafts 34 and 35 to rotate with an angular speed which equals half their own speed. The movement is consequently neutralized by the crown wheels 38 and 39 of the differential gear 40, and the bevel wheel 42 as well as the following member 3 are at rest. If the lever 2 is turned from the position represented in the drawings for instance to the left, the circuit of the electromotor 7 is closed by the contact 10 and the bar 4. As a consequence, the crown wheel 26 of the gear 24 is caused to rotate, and the number of revolutions of the shaft 34 is altered with respect to the shaft 20 as well as with respect to the shaft 35, the difference between the numbers of revolution of the crown wheels 38 and 39 no longer being equal to zero and the bevel wheel 42 rotating according to this difference. The following member therefore is made to rotate until the contact bar 4 slides off the contact 10, thus having effected a movement which corresponds to the displacement of the adjusting member.

When the crown wheels 26 and 27 of the differential gears 24 and 25 are driven in suitable direction, there is not required any energy except that which is necessary for overcoming the friction. The rotation is to be effected in such a sense that during the following process the wheels 26 and 27 rotate in a direction reverse to that of the shafts 34 and 35. The motors 7 and 9 may therefore be very small and consequently attain their full number of revolutions within an extremely short time. They may be connected direct without intensive sparks appearing at the contacts 4, 5 and 10. All the energy required for displacing the following member 3 is supplied by the principal motor 15 which, as it rotates continuously, may be of any size.

As shown in Figure 2, the control motors 7 and 9 according to Figure 1 may be replaced by a reversing motor 7' which rotates to the right or to the left, according to whether the lever 2 is on the bar 4 or on the bar 5. Between each of the two worm gears 30 and 31 and the motor 7' is disposed a coupling acting in one sense only, for instance a locking device 60 and a locking device 61, respectively. According to the sense of the rotation of the motor 7', one locking device is made to slide and the other to transmit the rotation to the appertaining worm gear 30 or 31. In this case the reversing motor always requires the same small amount of energy, regardless of the sense of its rotation. Instead of the locking gears, use may be made of freewheel couplings of the known kind.

Also in the constructional example according to Figures 3 to 5, the rotation of the motor 15 is transmitted to the following member 3 by way of two shafts 20 and 21, two differential gears 24 and 25 and two other shafts 34 and 35. The device according to Figures 3 to 5 differs from the one according to Figure 1 by the control of the differential gears. The crown wheels 22 and 23 of the differential gears 24 and 25 are connected by means of hollow shafts 28 and 29 to brake discs 44 and 45 near which are disposed brake blocks 46 and 47 (Figure 5) connected by means of springs 48 and 49 to a lever 50. This lever 50, which rotates about a pin 51, has at its upper end 52 the form of a fork, this fork gripping a bush 53 connected to the lever 2 and displaceable on the shaft 1. The following member 3 supports a bevel wheel which is connected by means of another bevel wheel 43 to the housing of the differential gear 40. On a disc 54 of the following member 3 is disposed a circular rod 55 (Figures 4 and 5) on which slides the lever 2. Regardless of its position, this lever 2 is made to touch the bar 55 by means of a spring 56 pressing against the lever 50. The guide rod 55 consists of two parts 55' and 55" each of which extends over nearly 180°. These two parts 55' and 55" which are of different thicknesses in the direction of the axis, are connected by wedge-shaped parts 57. Two continuously acting brakes 58 and 59 slide on the housings of the differential gears 24 and 25, these brakes being given such dimensions that they may brake the housings when the appertaining brakes 46 and 47, respectively, are released.

The device works in the following manner.

When in position of rest, the lever 2 touches approximately the middle of one of the wedge-shaped parts 57 so that the lever 50 is in the position represented in Figure 5. In this position, the two brakes 46 and 47 are applied and the crown wheels 22 and 23 at rest. As a consequence, the numbers of revolution of the shafts 34 and 35 are equal to each other and the rotation caused by the motor 15 is neutralized in the differential gear 40. The following member 3 is at rest. If the lever 2 is moved from the position represented in the drawings for instance towards the left, it arrives at the higher rod 55' and raises the lever 50 to such an extent that the brake 47 is withdrawn from the disc 45. The crown wheel 23 of the differential gear 25 being consequently released, the spring 59 may brake the housing so that the number of revolutions of the shaft 35 decreases and the difference of the two rotations is no longer neutralized in the differential gear 40. The consequence is that the following member 3 is caused to rotate until the lever 2 assumes its middle position on the wedge-shaped part 57.

Instead of the rod 55, use may be made of a guide groove which is deeply cut into the disc 54 at different places and automatically guides the lever 2. In this case, the spring 56 may be dispensed with. Instead of the friction brakes 44, 45 and 46 represented in the drawings, toothed ratchet wheels and pawls may be applied. The brakes may be influenced by the lever 2 electrically by magnets or the like instead direct in a mechanical way, the lever 2 suitably being constructed in this case as represented in Figure 1.

In the constructional example according to Figure 6, the driving machine is a motor 15 which drives the crown wheels 22 and 23 of two differential gears 24 and 25 by means of the worm gears 18 and 19 and shafts 20 and 21. The rolling movements of the planet wheels 32 and 33 are transmitted to shafts 34 and 35, respectively, which act upon the crown wheels 38 and 39 of a differential gear 40 by means of worm gears 36 and 37. The rolling movements of the planet wheels 41 of this gear are transmitted to the following member 3 by means of bevel wheels 42 and 43. To alter the numbers of revolution of each of the two shafts 34 and 35, the following arrangement is made. On the shaft 1 of the following member 3 is provided a lever 2 which is turned by means of a worm wheel 66 and a worm 68 influenced by a shaft 63. The shaft 63, which may be driven by a hand-operated crank 64, is coupled by means of bevel wheels 62 and 67 to a shaft 65. This shaft operates in the same way as the shaft of the motor 7' according to Figure 2, influencing as it does two couplings 60 and 61 each of which rotates in one sense only. These couplings act by means of worm gears 30 and 31 and hollow shafts 28 and 29 upon the crown wheels 26 and 27 of the differential gears 24 and 25, only one of these couplings working at a time.

When the following gear 3 is required to be moved, the hand-operated crank 64 is turned until the lever 2 assumes a position which corresponds to the desired position of the following member 3. According to the chosen sense of rotation, the crown wheel 26 or 27 is caused to rotate in a corresponding manner, this rotation being transmitted by way of the shaft 63, the bevel wheels 62, 67 and the shaft 65. As a consequence, the number of revolutions of the appertaining shaft 34 or 35 is decreased, and the following member 3 moves until it has a position which corresponds to that of the lever 2. The movements of the adjusting member 2 and of the following member 3 are simultaneous. The following member 3 therefore will have been given the desired position exactly at that time at which the lever 2 arrives at its respective position.

The lever 2 need not be disposed on the shaft about which the following member rotates. It is more convenient to provide the lever 2' in the manner indicated by dot-and-dash lines in the drawings on a special shaft 1' which influences the bevel wheel 62 by means of a worm gear 66', 68', a shaft 63' and a bevel wheel 67'. Also when the device is constructed in this way, turning the lever 2' about a definite angle causes the following member 3 to rotate either about the same angle or about an angle proportional to this angle. A special adjusting member indicating the position in each instance may be dispensed with entirely. Instead of this member use may be made of a corresponding appliance, for instance of a telescope by means of which the position of the following member 3 may be determined. When this position is required to be altered, the crank 64 or 64' is turned until the telescope shows that the following member has arrived at the desired position.

In the constructional example according to Figure 7, the arrangement of the parts is in general the same as in the example according to Figure 6, the difference being that in Figure 7 the differential gear 40 and the machine part 69 to be driven are coupled by means of a pair of spur wheels 70, and that the drive of the shaft 65, which is grooved in this case, is effected by means of a friction wheel gear 71, 72. The friction disc 71 of this gear is driven by the shaft 17 of the motor 15 through the agency of a bevel wheel gear 73 and a shaft 74. The adjustment of the friction wheel 72 along the grooved shaft 65 is effected by an adjusting member 75, a threaded spindle 76, and a handwheel 77. An index 78 fixed to the adjusting member 75 indicates on a scale 79 the distance of the friction wheel 72 from the centre of the friction disc 71, this distance corresponding to the speed of the machine part 69.

Whereas with the devices according to Figures 1 to 6, the control is constructed as a following control, that is to say, that by displacing the adjusting lever 2 the machine part 3 is influenced by the motor 15 only until it has effected a movement corresponding to that of the adjusting member, the device according to Figure 7 has a control by which the speed of the movement of the machine part 69 may be altered. This kind of control has advantages where machine elements are concerned which have to suffer frequent changes of speed without the speed zero being attained frequently. In the case of a decrease of the speed to zero, the device according to Figure 7 requires the friction wheel gear 71, 72 to be brought back into its zero position, in which the friction wheel 72 is in contact with the centre of the friction disc 71.

I claim:

1. In a device for controlling a movable machine part the moving direction of which is changeable, a continuously working driving machine, two differential wheel gears so coupled to this driving machine that those of their gears which correspond to each other have equal numbers of revolutions, two shafts, each of these two shafts being driven by one of these two differential wheel gears, a third differential wheel gear connected to the machine part to be controlled and so coupled to the said two shafts that equal numbers of revolutions of these two shafts cause the machine part to stop, a control gear mechanically so coupled to the two first said differential wheel gears that the number of revolutions of the one or the other of the said two shafts can be altered at will, this control gear having a hand-driven shaft and two couplings, each of these two couplings being disposed between this shaft and one of the two first said differential wheel gears, the two couplings being so constructed that driving the said shaft influences only one of the said two differential wheel gears, the sense of the rotation of the said shaft determining which of these two differential wheel gears is to be influenced, and two automatically locking gears, each of these two gears being disposed between one of the said two couplings and the appertaining differential wheel gear.

2. In a device for controlling a movable machine part the moving direction of which is changeable, a continuously working driving machine, two differential wheel gears so coupled to this driving machine that those of their gears which correspond to each other have equal numbers of revolutions, two shafts, each of these two shafts being driven by one of these two differential wheel gears, a third differential wheel gear connected to the machine part to be controlled and so coupled to the said two shafts that equal numbers of revolutions of these two shafts cause the machine part to stop, and a control gear mechanically so coupled to the two first said differential wheel gears that the number of revolutions of the one or the other of the said two shafts can be altered at will, this control gear having a brake device for influencing the two first said differential wheel gears.

3. In a device for controlling a movable machine part the moving direction of which is changeable, a continuously working driving machine, two differential wheel gears so coupled to this driving machine that those of their gears which correspond to each other have equal numbers of revolutions, two shafts, each of these two shafts being driven by one of these two differential wheel gears, a third differential wheel gear connected to the machine part to be controlled and so coupled to the said two shafts that equal numbers of revolutions of these two shafts cause the machine part to stop, and a control gear mechanically so coupled to the two first said differential wheel gears that the number of revolutions of the one or the other of the said two shafts can be altered at will, this control gear having a brake device for influencing the two first said differential wheel gears, this brake device comprising two controllable brakes and two continuously acting brakes, the braking effect of these two continuously acting brakes being inferior to that of the two controllable brakes, each of the two controllable as well as of the two continuously acting brakes influencing one of the two first said differential wheel gears, a device for controlling the said two controllable brakes, this device being so constructed that the one and the other of the two differential wheel gears may be alternatively withdrawn from the influence of the appertaining controllable brake, the purpose of the two continuously working brakes being to hold the appertaining driven shaft at rest when the appertaining controllable brake is released.

4. In a device for controlling a movable machine part the moving direction of which is changeable, a continuously working driving machine, two differential wheel gears so coupled to this driving machine that those of their gears which correspond to each other have equal numbers of revolutions, two shafts, each of these two shafts being driven by one of these two differential wheel gears, a third differential gear connected to the machine part to be controlled and so coupled to the said two shafts that equal numbers of revolutions of these two shafts cause the machine part to stop, a control gear mechanically so coupled to the two first said differential wheel gears that the number of revolutions of the one or the other of the said two shafts can be altered at will, this control gear having a brake device for influencing the two first said differential wheel gears, this brake device comprising two controllable brakes and two continuously acting brakes, the braking effect of these two continuously acting brakes being inferior to that of the two controllable brakes, each of the two controllable as well as of the two continuously acting brakes influencing one of the two first said differential wheel gears, a device for controlling the said two controllable brakes, this device being so constructed that the one and the other of the two differential wheel gears may be alternatively withdrawn from the influence of the appertaining controllable brake, the purpose of the two continuously working brakes being to hold the appertaining driven shaft at rest when the appertaining controllable brake is released, and one single adjusting member for controlling the two controllable brakes.

5. In a device for controlling a movable machine part the moving direction of which is changeable, a continuously working driving machine, two differential wheel gears so coupled to this driving machine that those of their gears which correspond to each other have equal numbers of revolutions, two shafts, each of these two shafts being driven by one of these two differential wheel gears, a third differential wheel gear connected to the machine part to be controlled and so coupled to the said two shafts that equal numbers of revolutions of these two shafts cause the machine part to stop, a control gear mechanically so coupled to the two first said differential wheel gears that the number of revolutions of the one or the other of the said two shafts can be altered at will, this control gear having a motor-driven speed change gear, the latter comprising a shaft rotating with changeable speed, two couplings, each of these two couplings being disposed between this shaft and one of the two first said differential wheel gears and so constructed that, when rotating, this shaft influences only one of the said two differential wheel gears, the sense of rotation of the said shaft determining which of these two differential wheel gears is to be influenced, and two automatically locking gears, each of these two locking gears being disposed between one of the said two couplings and the appertaining differential wheel gear.

6. In a device for controlling a movable machine part the moving direction of which is changeable, a continuously working driving machine, two differential wheel gears so coupled to this driving machine that those of their gears which correspond to each other have equal numbers of revolutions, two shafts, each of these two shafts being driven by one of these two differential wheel gears, a third differential wheel gear connected to the machine part to be controlled and so coupled to the said two shafts that equal numbers of revolutions of these two shafts cause the machine part to stop, a control gear electrically so coupled to the two first said differential wheel gears that the number of revolutions of the one or the other of the said two shafts can be altered at will, this control gear having two motors, each of these two motors running in one direction only, and a switch gear for alternatively switching the two motors.

7. In a device for controlling a movable machine part the moving direction of which is changeable, a continuously working driving machine, two differential wheel gears so coupled to this driving machine that those of their gears which correspond to each other have equal numbers of revolutions, two shafts, each of these two shafts being driven by one of these two differential wheel gears, a third differential wheel gear connected to the machine part to be controlled and so coupled to the said two shafts that equal numbers of revolutions of these two shafts cause the machine part to a stop, a control gear electrically so coupled to the two first said differential wheel gears that the number of revolutions of the one or the other of the said two shafts can be altered at will, this control gear having two motors, each of these two motors running in one direction only, a switch gear for alternatively switching the two motors, this switch gear having only one adjusting member for switching both motors, and two automatically locking gears, each of these two gears being disposed between one of the two motors and the appertaining differential wheel gear.

8. In a device for controlling a movable machine part the moving direction of which is changeable, a continuously working driving machine, two differential wheel gears so coupled to this driving machine that those of their gears which correspond to each other have equal numbers of revolutions, two shafts, each of these two shafts being driven by one of these two differential wheel gears, a third differential wheel gear connected to the machine part to be controlled and so coupled to the said two shafts that equal numbers of revolutions of these two shafts cause the machine part to stop, a control gear electrically so coupled to the two first said differential wheel gears that the number of revolutions of the one or the other of the said two shafts can be altered at will, the said control gear having a reversing motor, this reversing motor driving a shaft, two couplings, each of these two couplings being disposed between this shaft and one of the two first said differential gears, the two couplings being so constructed that only the one of the said two differential wheel gears is influenced when the said shaft rotates, the sense of rotation of the said shaft determining which of these two differential wheel gears is to be influenced, and two automatically locking gears, each of these two gears being disposed between one of the said two couplings and the appertaining differential wheel gear.

9. In a device for controlling a movable machine part the moving direction of which is changeable so that it automatically follows the movements of an adjusting member, a continuously working driving machine, a differential wheel gear, two automatically locking worm gears, means for coupling through the agency of one of the said two worm gears each of the two driving shafts of the said differential wheel gear to the said driving machine in such a manner that the said machine part is at rest when the ratio of the angular velocities of the two worms of the said two worm gears has a certain value, a control gear influenced by the said adjusting member, this control gear changing the said ratio and thus imparting to the said machine part a movement in one or the other direction, and two auxiliary differential wheel gears, each of these differential wheel gears comprising two driving shafts coupled to the said driving machine and to the said control gear, respectively, and a driven shaft to which is imparted the summary movement and which is coupled to one of the said two worms, the said control gear being so constructed that a change may be effected of the angular velocity of either the one or the other of those two driving shafts of the said two auxiliary differential wheel gears which are coupled to the control gear.

10. In a device for controlling a movable machine part the moving direction of which is changeable so that it automatically follows the movements of an adjusting member, a continuously working driving machine, a differential wheel gear, two automatically locking worm gears, means for coupling through the agency of one of the said two worm gears each of the two driving shafts of the said differential wheel gear to the said driving machine in such a manner that the said machine part is at rest when the ratio of the angular velocities of the two worms of the said two worm gears has a certain value, a control gear influenced by the said adjusting member, this control gear changing the said ratio and thus imparting to the said machine part a movement in one or the other direction, and two auxiliary differential wheel gears, each of these differential wheel gears comprising two driving shafts coupled to the said driving machine and to the said control gear, respectively, and a driven shaft to which is imparted the summary movement and which is coupled to one of the said two worms, the said control gear being so constructed that those two driving shafts of the said two auxiliary differential wheel gears which are coupled to the control gear are at rest when the said machine part is at rest and that starting the machine part in the one or the other direction may be effected by rotating the one or the other of these two shafts in such a sense as to decrease the angular velocity of the driven shaft of the appertaining auxiliary differential wheel gear.

HANS von KARABETZ.